United States Patent
Bedell

(10) Patent No.: US 9,326,526 B2
(45) Date of Patent: May 3, 2016

(54) SAUSAGE-TYPE FOOD PRODUCT ENCOMPASSING A CENTRAL OPENING

(75) Inventor: Donald C Bedell, Sikeston, MO (US)

(73) Assignee: Circle B Enterprises Holding Company, Inc., Sikeston, MO (US)

( * ) Notice: Subject to any disclaimer, the term of this patent is extended or adjusted under 35 U.S.C. 154(b) by 2182 days.

(21) Appl. No.: 11/776,397

(22) Filed: Jul. 11, 2007

(65) Prior Publication Data

US 2008/0014318 A1     Jan. 17, 2008

Related U.S. Application Data

(60) Provisional application No. 60/806,977, filed on Jul. 11, 2006.

(51) Int. Cl.
| | |
|---|---|
| *A23L 1/31* | (2006.01) |
| *A22C 11/12* | (2006.01) |
| *A21C 15/02* | (2006.01) |
| *A22C 11/00* | (2006.01) |
| *A23L 1/00* | (2006.01) |
| *A23L 1/22* | (2006.01) |
| *A23L 1/221* | (2006.01) |
| *A23L 1/317* | (2006.01) |

(52) U.S. Cl.
CPC .............. *A22C 11/127* (2013.01); *A21C 15/02* (2013.01); *A22C 11/00* (2013.01); *A23L 1/0067* (2013.01); *A23L 1/221* (2013.01); *A23L 1/22008* (2013.01); *A23L 1/3175* (2013.01)

(58) Field of Classification Search
CPC ...... A21C 15/02; A22C 11/00; A22C 11/127; A23L 1/0067; A23L 1/22008; A23L 1/221; A23L 1/3175

USPC .......................................... 426/140, 138, 281
See application file for complete search history.

(56) References Cited

U.S. PATENT DOCUMENTS

| | | | |
|---|---|---|---|
| 3,131,066 A * | 4/1964 | Mitzelfelt | 426/140 |
| 3,180,737 A * | 4/1965 | Culp | 426/412 |
| 3,781,447 A | 12/1973 | Durso | |
| 3,857,330 A | 12/1974 | Ruckstaetter | |
| 4,106,162 A * | 8/1978 | Fournier | 425/298 |
| 4,356,201 A | 10/1982 | Winkler | |
| 4,369,195 A * | 1/1983 | Nelson et al. | 426/62 |
| 4,640,187 A | 2/1987 | Wallick et al. | |
| 4,778,686 A | 10/1988 | Chauvin | |
| 4,938,988 A | 7/1990 | Fankhauser | |
| 4,975,309 A | 12/1990 | Gord et al. | |
| 4,999,204 A | 3/1991 | Gibson | |
| 5,264,230 A | 11/1993 | Swanson | |
| 5,951,943 A | 9/1999 | Auf Der Heide et al. | |
| 6,187,362 B1 | 2/2001 | Breu et al. | |

(Continued)

OTHER PUBLICATIONS

Rita Schrank, Egg in a Nest, p. 52, of Science, Math and Nutrition for Toddlers, , Humanics Publication, 1998.*

(Continued)

*Primary Examiner* — Vera Stulii
(74) *Attorney, Agent, or Firm* — Lewis Rice LLC

(57) ABSTRACT

A shaped food product, such as a sausage, having a central opening into which at least one condiment may be placed prior to consumption and methods of preparing, eating, and manufacturing such a food product. The condiment may be placed after the cooking of the food product, prior to the cooking of the food product, or as part of the cooking of the food product.

2 Claims, 5 Drawing Sheets

(56) References Cited

U.S. PATENT DOCUMENTS

| | | |
|---|---|---|
| 6,428,830 B1 | 8/2002 | Matthews et al. |
| 6,444,245 B1 | 9/2002 | Burger |
| 8,057,834 B2 | 11/2011 | Kwitek |
| 2004/0108332 A1 | 6/2004 | Brient et al. |
| 2006/0029716 A1 | 2/2006 | Harker |

OTHER PUBLICATIONS

Meat-Loaf Ring, p. 155, Art & Rosie's Home-tested recipes, Writers Club Press, 2002.*

Kielbasa, p. 29, in The Best of Polish Cooking, by Daren West, 1983, Hippocrene Books, Inc.*

* cited by examiner

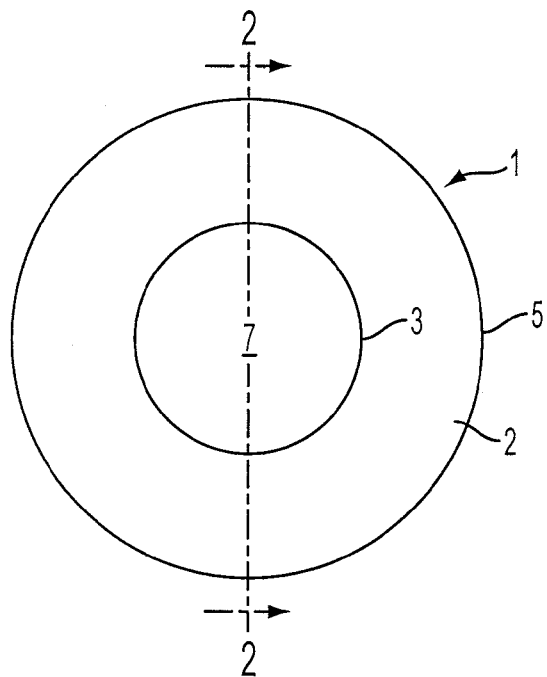
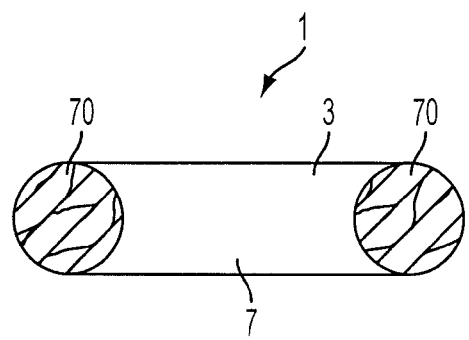
FIG. 1              FIG. 2
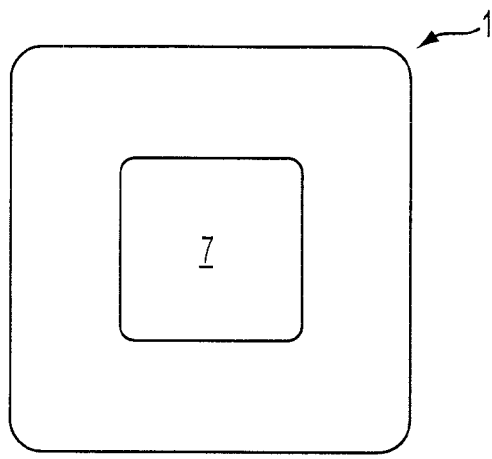
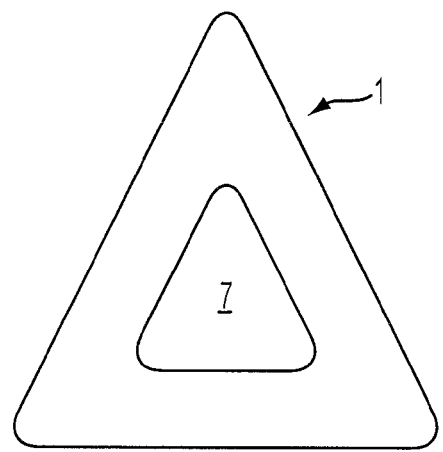
FIG. 3              FIG. 4

SAUSAGE-TYPE FOOD PRODUCT ENCOMPASSING A CENTRAL OPENING

CROSS REFERENCE TO RELATED APPLICATION(S)

This application claims benefit of U.S. Provisional Patent Application Ser. No. 60/806,977 filed Jul. 11, 2006, the entire disclosure of which is herein incorporated by reference.

BACKGROUND

1. Field of the Invention

The present invention relates to a food product, specifically a sausage, formed so as to encompass a central opening, as well as methods of making, serving and eating the same. More particularly, the invention relates to a food product encompassing a central opening wherein such opening includes other food or food products.

2. Description of the Related Art

Typically, sausages are produced and sold in a generally cylindrical form, most often being longer than wide (i.e., having a diameter smaller than its length). Not uncommonly, sausages are curved into "C" and similar shapes. Generally, however, sausages made for single serving use, such as frankfurters, Italian sausage, and bratwurst, are either generally straight (more-or-less cylindrical) or only slightly curved (e.g., generally resembling the shape of a rocker of a rocking chair). Often, such single serving sausages are eaten on a hard roll or bun that is similarly relatively long and narrow, the sausage being topped with any of a variety of condiments.

One problem with such a preparation (i.e., sausage topped with condiments on a roll or bun) is that the condiments often fall off of the sausage and out of the roll or bun. This problem is exacerbated by the rounded nature of the generally cylindrical sausage, as opposed to the generally flat, disc-like shape of hamburger patties.

In another common serving style, sausages are combined on a plate with cooked egg or a cooked egg preparation, such as an omelet, particularly for a breakfast meal. To take advantage of this culinary preference and the practical ease of eating a sandwich, in recent years it has become popular to create a sandwich comprising a sausage patty topped by a cooked egg (whether scrambled, fried, or poached) in between halves of a biscuit, bagel, or English muffin. The creation of such a sandwich is generally relatively labor intensive, since each of the components are often cooked separately, then assembled into such a sandwich.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

In light of the problems discussed above, herein disclosed is a sausage encompassing a central opening, such as a toroidal sausage, which can be served with condiments positioned in the central opening, where the condiments are relatively contained by the sausage itself during the eating of the sausage. Further disclosed is a sausage encompassing a central opening that is manufactured for commercial distribution with condiments located in the central opening. In an embodiment, such a product is ready to serve. Further disclosed is a sausage encompassing a central opening manufactured with food product located in the central opening prior to the cooking or curing of the sausage, which cooking or curing is then performed on the combination of the sausage and food product prior to distribution. In an embodiment, this later disclosed sausage may, alternatively or additionally to condiments, include egg in the central opening prior to cooking. Such a sausage, manufactured with condiments or egg or both in the central opening can then be cooked and distributed as a combination food. In particular, such a combination food including in the central opening of a uncooked sausage a food product, such as onion, sweet or spicy pepper, sauerkraut, chili, egg, potato, or any combination thereof, is advantageous, since these example foods and others that are put in the central opening are foods that need to be cooked or can be cooked without undesired consequence. Thus, in an embodiment, the sausage and the central opening filling (e.g., sauerkraut, egg, potato, etc., with or without other condiments) can be cooked together rather than separately. In an embodiment, the combination product becomes, after cooking, a sausage surrounding an omelet or other egg-based product.

Described herein, among other things is a food product comprising: a bun comprising two separable pieces, each of the pieces and the bun having a similar shape; a sausage comprising: a main body, the main body having a shape generally approximating that of the pieces of the bun and placed between the pieces of the bun so as to contact the bun along a plane; and a central opening encompassed by the main body; and at least one condiment, the condiment being placed within the central opening; wherein the at least one condiment is held within the central opening by the main body and the pieces of the bun.

In an embodiment of the food product the condiment may comprise a liquid or a solid at standard temperature and pressure. The condiment may comprise ketchup, mustard, relish, onions, peppers, sauerkraut, or egg which may be cooked in the central opening while the sausage is cooked.

In an embodiment, the main body of the sausage comprises ground vegetable matter or ground meat. The main body may be torroidal in shape and the bun may be circular.

In another embodiment, there is described, a food product comprising: sausage formed into a main body; a central opening encompassed by the main body; and at least one condiment, the condiment being placed within the central opening; wherein the at least one condiment is placed within the central opening prior to the sausage being cooked.

In a still further embodiment of the food product, the condiment comprises at least one of egg, onion, pepper, sauerkraut, chili, or potato and the condiment may be cooked simultaneously with the sausage or heated simultaneously to the cooking of the sausage.

In a still further embodiment, there is described a method of preparing and eating a food product comprising: providing a bun having two separable pieces, each of the pieces and the bun having a similar shape; and a sausage including: a main body, the main body having a shape generally approximating that of the pieces of the bun and a central opening encompassed by the main body; placing the sausage on a first of the pieces of the bun; arranging a condiment in the central opening; placing a second of the pieces on the sausage an the side opposing the first of the pieces; and consuming the bun, the sausage and the condiment as a single food product.

In different embodiments of the method, the step of arranging the condiment occurs prior to either of the steps of placing, the step of arranging the condiment occurs between the steps of placing, or the main body includes an opening accessing the central opening and the step of arranging the condiment occurs after both the steps of placing.

BRIEF DESCRIPTION OF THE DRAWINGS

FIG. 1 shows a top plan view from the top of an embodiment of food product comprising a central opening which includes a toroidal shaped main body.

FIG. 2 shows a cross-sectional view along the line 2-2 shown on the embodiment depicted in FIG. 1.

FIG. 3 shows a top plan view of an alternate embodiment of a sausage encompassing a central opening, wherein the sausage has a shape generally similar to a square.

FIG. 4 shows a top plan view of an alternate embodiment of a sausage encompassing a central opening, wherein the sausage has a shape generally similar to a triangle.

DESCRIPTION OF THE PREFERRED EMBODIMENT(S)

Figure 5:
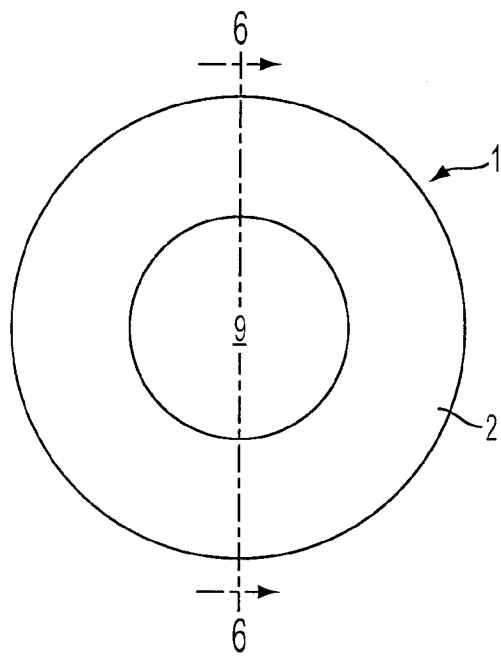
FIG. 5 shows a plan view from the top of an embodiment comprising a toroidal sausage having a filled center opening.

The following detailed description illustrates by way of example and not by way of limitation, Described herein, among other things, are embodiments of food products which encompass a central opening that will generally include a secondary food product at the time of consumption. These food products may be referred to as sausages. However, while a sausage is used as an exemplary embodiment, it should be recognized that other food products can be served in this fashion. The sausages are generally eaten with a secondary food product, which will often be referred to herein as a condiment, placed internal to the central opening. The condiment, depending on embodiment, may be added after preparation and serving of the sausage to an end consumer, after preparation but before serving, prior to preparation, during preparation, or during manufacture.

A sausage generally comprises ground meat, meat products, fillers, such as grains or grain products and vegetable derived products, and flavorings, such as herbs and spices, all of which is traditionally packed in a casing. Vegetarian and other non-meat based sausages, such as sausages comprising only plant products, such as, but not limited to, processed soy, potato, corn, or grain products are also known. Further known are similar meat-based or vegetable-based composite products that are not packed in casings but are still effectively sausage. One example is pork breakfast sausage which is often formed into a cylindrical shape, but may have no external casing. All such meat-based composite food products whether or not in a casing shall be considered sausage for purposes of this disclosure, as shall any vegetarian substitutes. Such sausages may be produced and sold raw, cooked, pre-cooked, or preserved, such as by curing or smoking. A very large number of variations on the contents and preparation methods for sausages exist, leading to a large number of names for such variations, including andouille, blood sausage, bratwurst, chorizo, haggis, kielbasa, knackwurst, liver sausage, salami, as well as the common hot dog or frankfurter, among many others. While this application generally refers to a sausage, the term "sausage" as used herein is exemplary of and is used to name any sausage-type food product as described herein, including but not limited to any of the various sausages named above.

Condiment, is used herein as a general term to refer to any food product commonly eaten with a sausage other than a bun upon which it is placed. This can include, but is not limited to, ketchup, mustard, mayonnaise, pickle, pickle relish, onion (raw or grilled), peppers (sweet or spicy, grilled, raw, or pickled), tomato, and others, including cheeses (natural, processed, or sauce), chili, coleslaw, sauerkraut, other relishes (e.g., corn relish), other sauces (e.g., barbeque sauce), salsa, vegetables (e.g., mushroom, cucumber, olive, etc.; any of which may technically be fruits), seasonings (e.g., salt, ground dried pepper, including black or white pepper, cayenne pepper, etc., and all varieties of herbs and spices), eggs and egg products (e.g. processed egg product or egg white) and any combination of these.

Referring now to the Figures, several embodiments of a food product comprising a sausage, encompassing a central opening which may include condiments, are described. FIG. 1 shows a plan view from the top of a toroidal sausage 1 by itself. This sausage comprises a main body 2 which has an inner surface 3 and outer surface 5 and a central opening 7 surrounded by the sausage 1, and particularly surrounded by the inner surface 3. The embodiment shown is FIG. 1 is more clearly understood by considering the cross-sectional view of FIG. 2, which is a cross-sectional view of the embodiment shown in FIG. 1 along the line 2-2, as if looking in the direction of the arrows crossing either end of line 2-2. FIG. 2 shows the cut through central opening 7 and revealed inner surface 3, along with a cross section of the composite 70 forming the main body 2.

Figure 9:
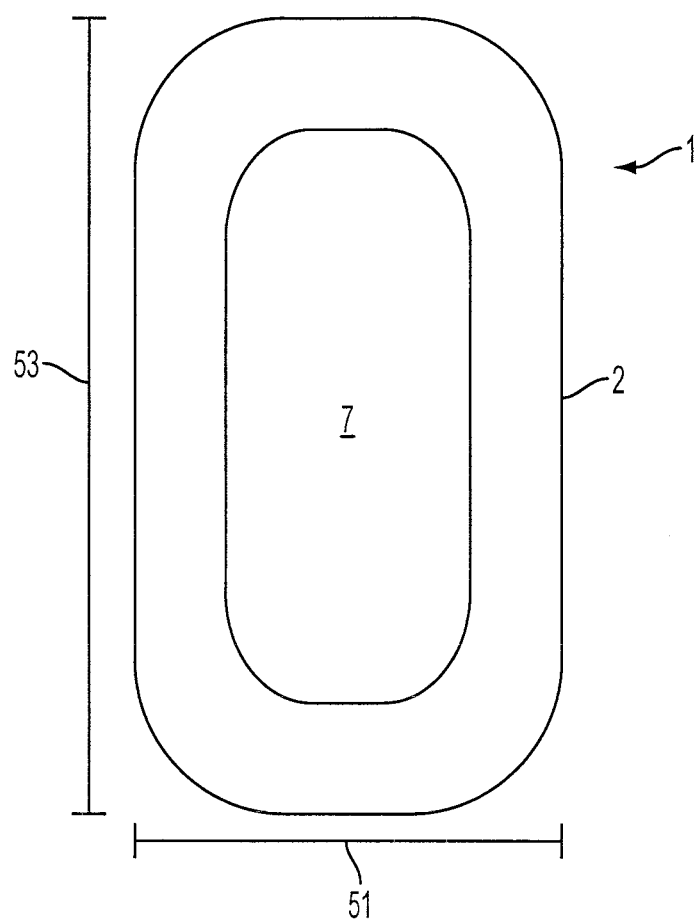
FIG. 9 shows a top plan view of an alternative embodiment of a sausage encompassing a central opening wherein the sausage has a generally ovular shape.

The sausage 1 shown in FIG. 1 has a generally circular shape in its major plane (that is the dimensions parallel with the page of the drawing). In alternate embodiments, the sausage 1 may take on other general shapes of other geometric or random shapes, for example, a square as shown in or FIG. 3, a triangle FIG. 4, an oval as shown in FIG. 9, a rhombus, a trapezoid or other shapes. In an embodiment, the shape of the sausage may be selected to correspond to the shape of a bun upon which the sausage is placed. The term "bun" as used herein can refer to any of a variety of bread products which are used to sandwich the contents of the bun between two pieces or slices of the bun. Therefore, a bun is intended to include, but is not limited to, a bun, roll, bread loaf, pastry, roll, slices of bread, bagel, English muffin, biscuit, croissant, or any combination of these.

Figure 10:
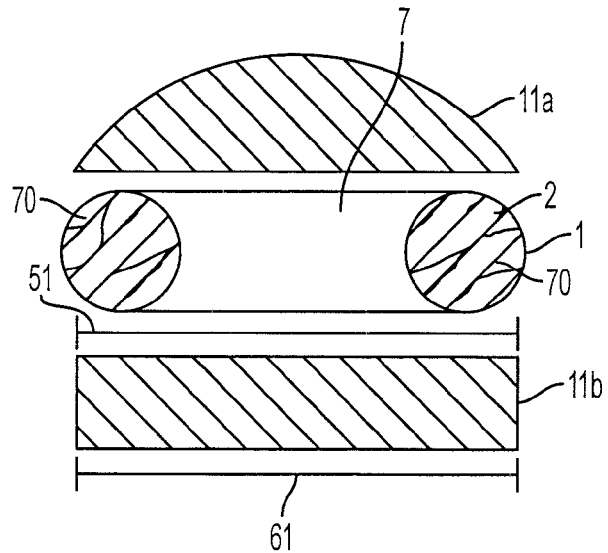
FIG. 10 shows a cross-sectional view of the sausage of FIG. 9 placed on a generally ovular bun.
Figure 11:
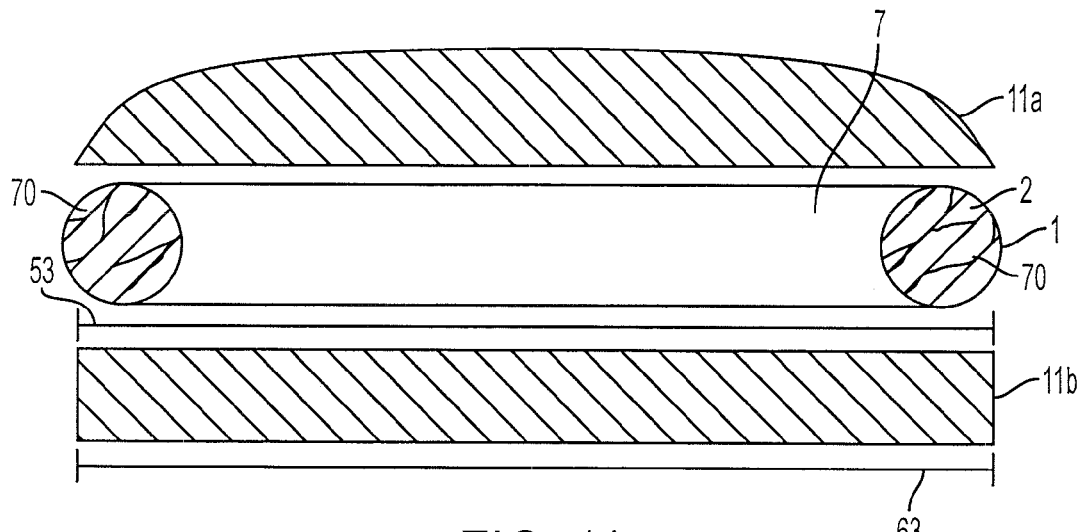
FIG. 11 shows a cross-sectional view along the opposing dimension to FIG. 10 of the sausage FIG. 9 placed on a generally ovular bun.

In the embodiment of FIGS. 9-11 the shape of the sausage 1 is selected to correspond to the shape of a bun 11. The sausage 1 of FIG. 9 is generally ovular, and therefore can correspond to the shape of the ovular bun (such as, but not limited to, a hoagie roll), In its major plane, (the plane of the page of FIG. 9) the sausage 1 has two major dimensions 51 and 53. The bun 11 generally comprises two pieces 11a and 11b which are used by being placed on opposing sides (generally the top and bottom) of the sausage 1. Corresponding shapes are generally determined by having the general shape of the major plane of the sausage 1 be similar to the outer surface of the adjacent planar surfaces of the bun 11. This is shown in the cross sections of FIGS. 10 and 11 where the dimensions 51 and 53 of the sausage 1 are generally similar to dimensions 61 and 63 of the bun 11.

Figure 13:
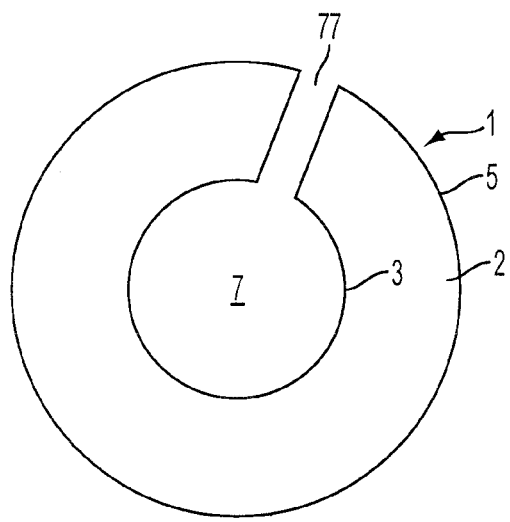
FIG. 13 shows a top view of a toroidal sausage with an access opening cutting clean through the main body cross-section.
Figure 14:
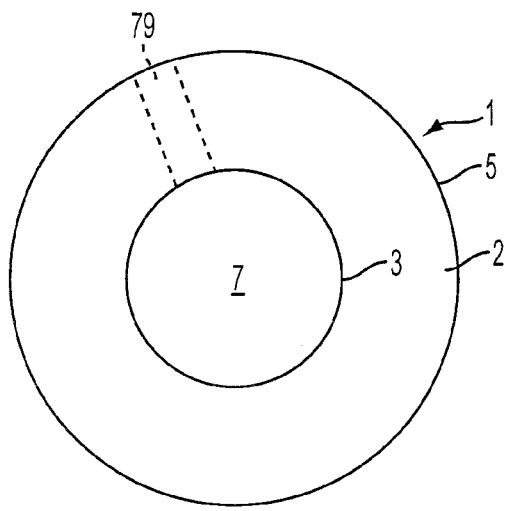
FIG. 14 shows a top view of a toroidal sausage with an access opening within the main body cross-section.

Whatever the shape of the main body 2, the sausage also has a central opening 7, which is substantially surrounded by sausage 1 in two directions. This substantially surrounded central opening 7 is a location for advantageously positioning condiments and other food products. When a sausage 1 encompassing a central opening 7 is placed on a roll or bun such as bun 11, the pieces of the bun being placed above and below the sheet in the picture of FIG. 9, condiments or other food products can be placed in the central opening 7, where they will not fall off of the sausage 1 and are generally contained by the main body 2 and the two pieces of the bun 11 as is apparent in FIGS. 10 and 11. In alternate embodiments, such as those shown in FIGS. 13 and 14, the central opening 7 may not be completely surrounded by the sausage 1, such as would be the case if the sausage 1 of the circular embodiment shown in FIG. 1 did not make a complete circle, but a side opening 77 remained between two ends of the sausage 1 as shown in FIG. 13. Alternatively, the sausage 1 main body 2 may include an opening 79 which does not cut all the way through the sausage 1 ring but provides a hole through it as shown in FIG. 14. This opening may be used to place condiments in the central opening 7 once the two pieces of the bun 11 are in place.

Figure 12:
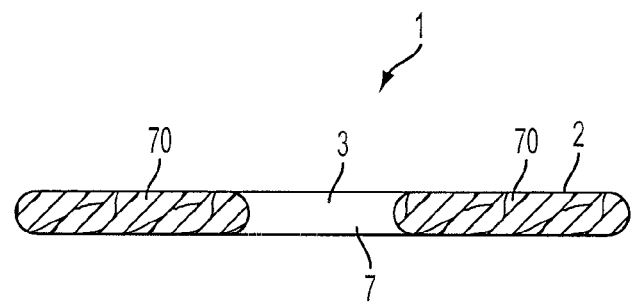
FIG. 12 shows a cross-sectional view of a sausage whose composite section is non-circular.

In alternate embodiments, the cross-sectional area of the central opening 7 of the sausage 1 need not be a circle or oval but, as shown in FIGS. 3 and 4, may be any shape feasible for a sausage 1 including being generally square or triangular. Still further, the cross sectional shape of the sausage 1 above the central opening need not be round as shown in FIGS. 2, 6, 8, 10 and 11, but may have alternative shape, such as that shown in FIG. 12 which is flattened, squared, or otherwise altered from circular. A flattened shape, such as that of FIG. 12, can make the sausage 1 even more stable on a bun 11, but generally provides less space for condiments 9 in the central opening 7.

Figure 6A:
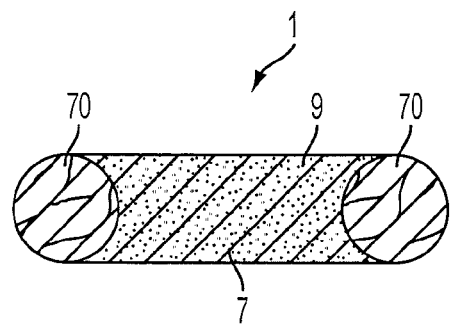
FIGS. 6A and 6B show cross-sectional views along the line 6-6 of alternate embodiments of a sausage as depicted in FIG. 5.
Figure 6B:
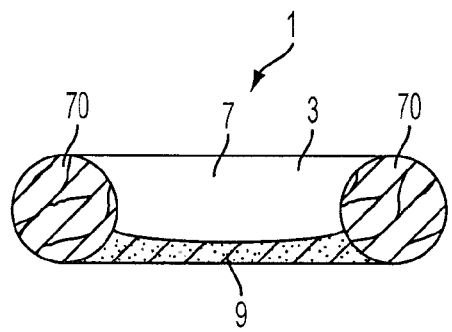

FIG. 5 shows a toroidal sausage 1 in which the central opening 7 has been filled with a food product, specifically a condiment 9, which is other than sausage 1. The configuration of the combination of the sausage 1 and condiment 9 filling in this embodiment is more clearly illustrated when also considering FIGS. 6A and 6B, which are alternate cross-sectional views of the embodiment shown in FIG. 5 along the line 6-6, as if looking in the direction of the arrows crossing either end of line 6-6. FIG. 6A shows the food condiment 9 completely filling the central opening 7, and having a height no greater or lesser than the sausage. In alternate embodiments, the condiment 9 has a height either greater (not shown) or lesser (FIG. 6B) than that of the sausage 1. In a further alternate embodiment, condiment 9 is positioned about the circumference of the central opening 7, leaving a portion of the central opening 7 open, as shown for an embodiment in FIGS. 7 and 8.

Regardless of the position of the condiment 9 within the central opening 7, the food product including the sausage 1 and condiment 9, in an embodiment, may be formed together during manufacture in a variety of manners, often depending upon the type and consistency of the food product. Alternatively, the condiment 9 may be added to the sausage 1 by an end user once the sausage 1 has been placed on a bun 11 (such as by temporarily removing half the bun 11), may be added by the sausage preparer after the sausage 1 is cooked or cured, but prior to serving to the consumer, may be added while the sausage 1 is being cooked or cured, or may be added prior to the sausage 1 being cooked or cured.

In an exemplary use of a condiment 9 being added prior to the end consumer, the condiment 9 is a frozen solid, held in place only while maintained at low temperature. In such an embodiment, the condiment 9 is frozen in position during manufacture, and will thaw upon warming of the sausage in preparation for serving the same The condiment 9 in various of such embodiments includes ketchup, mustard, relish, or any of various condiments having sufficient liquid content to freeze into a solid but being considered a liquid at standard temperature and pressure. Further examples of condiment 9 in such an embodiment include liquids in which the sausage is to be cooked. For example, in an embodiment the condiment 9 is Worcestershire sauce, fruit juice, vinegar, beer, or a like liquid, alone or in combination. In an embodiment, a sausage 1 having such a frozen condiment 9 in its central opening 7 (as shown, for example in either FIG. 5 or FIG. 7) is put in a dish and cooked. During cooking thereof, the condiment 9 thaws and interacts with the sausage 1, for example so as to change the flavor or the texture of the sausage 1 (e.g., resulting from cooking in beer, which had been frozen as condiment 9) or simply to coat at least a portion of the inner surface 3 of the sausage 1 resulting in its end consumer receiving a product such as that shown in FIGS. 7 and 8.

In an alternate embodiment, the condiment 9 is a viscous mixture that is not generally solid, but may include chunks of food, as for example, mayonnaise, potato salad, or sauerkraut. In such an embodiment, the condiment 9 may but need not be frozen in order to maintain its position within the sausage. In an embodiment, such a viscous mixture condiment 9 maintains its shape and position within the central opening 7 simply by being packed into the central opening 7 or by surface tension with sausage 1. In an embodiment, the sausage 1 containing condiment 9 is fried in a pan or on a grill, and can be flipped from one side to another to fully cook the sausage 1 and the condiment 9 without a substantial amount of the condiment 9 falling out from within the central opening 7. In an alternative embodiment, the sausage 1 can be cooked in a specially designed cooking apparatus, such as but not limited to a heating apparatus of internal shape and size to correspond to the outer surface 5 of the sausage 1 which maintains the relative positions of the sausage 1 and condiment 9 during cooking. This may also involve cooking the sausage 1 and condiment 9 in the bun 11.

In a further embodiment, the condiment 9 is of a consistency that would be considered a solid food product at standard temperature and pressure, such as a cooked egg or another type of sausage. In such an embodiment, the solid nature of the condiment 9 allows the condiment 9 to remain in position within the central opening 7, whether or not frozen. For example, in an embodiment, a second sausage ring (toroid) is the condiment 9 as depicted in FIG. 5 or 7 providing for two types of sausage to be provided together.

Figure 7:
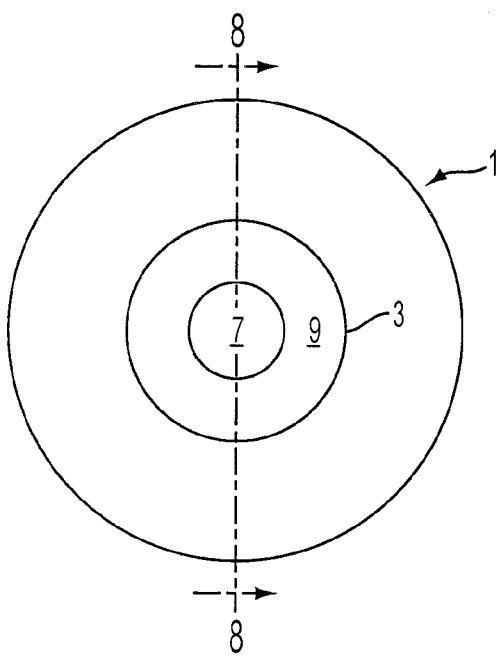
FIG. 7 shows a plan view from the top of an embodiment of a sausage having food product positioned about the circumference of the central opening.
Figure 8:
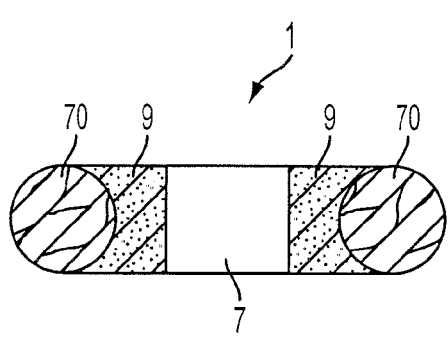
FIG. 8 shows a cross-sectional view along the line 8-8 shown on the embodiment depicted in FIG. 7.

In a still further embodiment, an egg product (e.g., either eggs alone or eggs mixed with other foods) is the condiment 9, as depicted in FIG. 5 or 7. Alternate embodiments of this type, having a condiment 9 of a generally solid consistency, are distributed either before or after cooking of the sausage and condiment 9. For example, a fluid egg product could be frozen in place within the central opening 7 (as discussed above for other frozen condiments 9), distributed frozen, then when cooked, become a solid, or could be cooked to a solid first, then distributed. Similarly, a batter or dough could be positioned in the central opening 7 and cooked with the sausage 1, either before or after distribution.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method of preparing and eating a food product comprising:
    providing a bun having two separable pieces, each of said pieces and said bun having a similar shape; and a raw sausage including: a toroidal main body, said toroidal main body having a shape generally approximating that of said pieces of said bun and a central opening encompassed by said toroidal main body;
    arranging a condiment in said central opening prior to the cooking of said sausage;
    cooking said sausage simultaneously with heating said condiment; placing said simultaneously cooked sausage and heated condiment on a first of said pieces of said bun;
    placing a second of said pieces on said sausage and the side opposing said first of said pieces;
    consuming said bun, said sausage and said condiment as a single food product.

2. The food product of claim 1 wherein said condiment is raw prior to being placed in said central opening and is cooked simultaneous to the cooking of said sausage.

* * * * *